(12) United States Patent
Yamazaki et al.

(10) Patent No.: US 10,643,763 B2
(45) Date of Patent: May 5, 2020

(54) DIRECT-CURRENT CABLE, COMPOSITION AND METHOD OF MANUFACTURING DIRECT-CURRENT CABLE

(71) Applicant: SUMITOMO ELECTRIC INDUSTRIES, LTD., Osaka (JP)

(72) Inventors: Takanori Yamazaki, Ibaraki (JP); Yoshinao Murata, Tokyo (JP); Tomohiko Katayama, Ibaraki (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/531,104

(22) PCT Filed: Aug. 5, 2016

(86) PCT No.: PCT/JP2016/073095
§ 371 (c)(1),
(2) Date: May 26, 2017

(87) PCT Pub. No.: WO2017/026391
PCT Pub. Date: Feb. 16, 2017

(65) Prior Publication Data
US 2017/0330645 A1    Nov. 16, 2017

(30) Foreign Application Priority Data
Aug. 10, 2015   (WO) ................. PCT/JP2015/072676

(51) Int. Cl.
| | |
|---|---|
| *H01B 3/44* | (2006.01) |
| *B29C 48/00* | (2019.01) |
| *B29C 48/78* | (2019.01) |
| *B29C 48/154* | (2019.01) |
| *C08K 3/00* | (2018.01) |
| *C08L 23/04* | (2006.01) |
| *H01B 3/00* | (2006.01) |
| *H01B 3/30* | (2006.01) |
| *C08K 3/34* | (2006.01) |
| *C08K 3/013* | (2018.01) |
| *C08K 3/04* | (2006.01) |
| *C08K 3/22* | (2006.01) |
| *C08K 3/36* | (2006.01) |
| *C08K 5/14* | (2006.01) |
| *C08K 5/375* | (2006.01) |
| *C08K 9/06* | (2006.01) |
| *H01B 7/02* | (2006.01) |

(Continued)

(52) U.S. Cl.
CPC .......... *H01B 3/441* (2013.01); *B29C 48/022* (2019.02); *B29C 48/154* (2019.02); *B29C 48/78* (2019.02); *C08K 3/00* (2013.01); *C08K 3/013* (2018.01); *C08K 3/04* (2013.01); *C08K 3/22* (2013.01); *C08K 3/34* (2013.01); *C08K 3/36* (2013.01); *C08K 5/14* (2013.01); *C08K 5/375* (2013.01); *C08K 9/06* (2013.01); *C08L 23/04* (2013.01); *C08L 23/06* (2013.01); *H01B 3/006* (2013.01); *H01B 3/307* (2013.01); *H01B 7/0275* (2013.01); *H01B 13/14* (2013.01); *B29K 2023/0633* (2013.01); *B29K 2023/0691* (2013.01); *B29K 2096/02* (2013.01); *B29K 2507/04* (2013.01); *B29K 2509/00* (2013.01); *B29K 2509/02* (2013.01); *B29K 2509/08* (2013.01); *B29K 2995/0007* (2013.01); *B29L 2031/3462* (2013.01); *C08K 2003/222* (2013.01); *C08K 2003/2227* (2013.01); *C08K 2201/001* (2013.01); *C08K 2201/003* (2013.01); *C08K 2201/006* (2013.01); *C08L 2203/202* (2013.01); *C08L 2205/02* (2013.01); *C08L 2207/066* (2013.01); *C08L 2312/00* (2013.01)

(58) Field of Classification Search
CPC ........ H01B 3/004; H01B 3/441; H01B 9/027; H01B 7/295; C08L 2203/202; C08K 2003/222
See application file for complete search history.

(56) References Cited

U.S. PATENT DOCUMENTS

| | | | | |
|---|---|---|---|---|
| 6,277,902 B1 * | 8/2001 | Scholl | .................. | C08K 9/04 152/450 |
| 6,534,119 B1 * | 3/2003 | Tsuji | .................. | C08L 23/0815 427/117 |

FOREIGN PATENT DOCUMENTS

| | | | |
|---|---|---|---|
| CN | 103613828 | * | 3/2014 |
| CN | 103627064 | * | 3/2014 |

(Continued)

OTHER PUBLICATIONS

Pallon et al "Formation and the structure of freeze-dried MgO nanoparticle foams and their electrical behaviour in polyethylene", J. Mater. Chem. A, 2015, 3, 7523, published on Feb. 2015.*

(Continued)

*Primary Examiner* — Gregory Listvoyb
(74) *Attorney, Agent, or Firm* — IPUSA, PLLC

(57) ABSTRACT

The direct-current cable includes a conductive portion; and an insulating layer covering an outer periphery of the conductive portion, the insulating layer containing cross-linked base resin and inorganic filler, the base resin containing polyethylene, a BET specific surface area of the inorganic filler being greater than or equal to 5 $m^2/g$ and less than or equal to 150 $m^2/g$, and a mean volume diameter of the inorganic filler being less than or equal to 1.0 μm, the mass ratio of the inorganic filler with respect to the base resin being greater than or equal to 0.001 and less than or equal to 0.05, and the cross-linked base resin being cross-linked by a cross-linking agent containing organic peroxide.

7 Claims, 1 Drawing Sheet

(51) Int. Cl.
*C08L 23/06* (2006.01)
*H01B 13/14* (2006.01)
*B29K 509/00* (2006.01)
*B29K 96/02* (2006.01)
*B29K 23/00* (2006.01)
*B29K 507/04* (2006.01)
*B29K 509/02* (2006.01)
*B29K 509/08* (2006.01)
*B29L 31/34* (2006.01)

(56) References Cited

FOREIGN PATENT DOCUMENTS

| | | |
|---|---|---|
| EP | 2743306 | 6/2014 |
| EP | 2922068 | 9/2015 |
| JP | H04-368717 | 12/1992 |
| JP | 2013-026048 * | 2/2013 |
| JP | 2014-218617 | 11/2014 |
| JP | 2014-238996 | 12/2014 |
| JP | 2015-000883 | 1/2015 |
| WO | 2011/093211 | 8/2011 |
| WO | WO 2015090643 * | 6/2015 |
| WO | 2016/101988 | 6/2016 |

OTHER PUBLICATIONS

U.S. Appl. No. 15/747,324, filed Jan. 24, 2018.
Database WPI Week 201154 Thomson Scientific, London, GB; AN 2011-K02613 XP002783012.

* cited by examiner

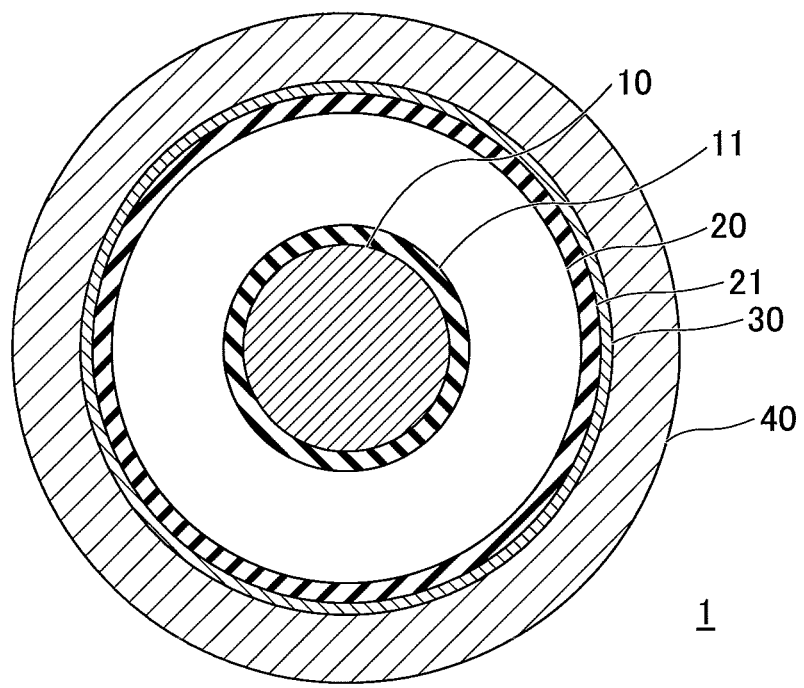

DIRECT-CURRENT CABLE, COMPOSITION AND METHOD OF MANUFACTURING DIRECT-CURRENT CABLE

CROSS-REFERENCE TO RELATED APPLICATION

The present application is based on and claims the benefit of priority of PCT International Application No. PCT/JP2015/072676 filed on Aug. 10, 2015, the entire contents of which are hereby incorporated by reference.

BACKGROUND OF THE INVENTION

1. Field of the Invention

The present invention relates to a direct-current cable, a composition and a method of manufacturing a direct-current cable.

2. Description of the Related Art

Patent Document 1 discloses a direct-current cable including a conductive portion and an insulating layer that covers an outer periphery of the conductive portion. The insulating layer contains resin composition, as a main constituent, formed by adding inorganic filler of magnesium oxide or carbon black, and greater than or equal to 0.01 parts by weight and less than or equal to 0.50 parts by weight of a metal salt of a fatty acid, based on 100 parts by weight of polyethylene, to polyethylene.

Patent Document 2 discloses a direct-current cable including an insulating layer formed by cross-linking polyethylene composition and provided on an outer periphery of a conductor. The polyethylene composition contains polyethylene (A), ethylene-methacrylate copolymer (B), and inorganic filler (C) selected from either of magnesium oxide and carbon black.

PATENT DOCUMENTS

[Patent Document 1] Japanese Laid-open Patent Publication No. 2014-218617
[Patent Document 2] Japanese Laid-open Patent Publication No. 2015-883

SUMMARY OF THE INVENTION

The direct-current cable of the disclosure includes a conductive portion; and an insulating layer covering an outer periphery of the conductive portion, the insulating layer containing cross-linked base resin and inorganic filler, the base resin containing polyethylene, a BET specific surface area of the inorganic filler being greater than or equal to 5 $m^2/g$ and less than or equal to 150 $m^2/g$, and a mean volume diameter of the inorganic filler being less than or equal to 1.0 µm, the mass ratio of the inorganic filler with respect to the base resin being greater than or equal to 0.001 and less than or equal to 0.05, and the cross-linked base resin being cross-linked by a cross-linking agent containing organic peroxide.

The composition of the disclosure include base resin, inorganic filler and a cross-linking agent, the base resin containing polyethylene, a BET specific surface area of the inorganic filler being greater than or equal to 5 $m^2/g$ and less than or equal to 150 $m^2/g$, and mean volume diameter of the inorganic filler being less than or equal to 1.0 µm, the mass ratio of the inorganic filler with respect to the base resin being greater than or equal to 0.001 and less than or equal to 0.05, and the cross-linking agent containing organic peroxide.

BRIEF DESCRIPTION OF THE DRAWINGS

FIG. 1 is a cross-sectional view illustrating an example of a direct-current cable.

DETAILED DESCRIPTION OF THE PREFERRED EMBODIMENTS

However, it is desired to improve long-term insulating performance of an insulating layer against applied direct-current voltage.

Thus, it is a purpose to provide a direct-current cable in which long-term insulating performance of an insulating layer against applied direct-current voltage and space-charge characteristics of an insulating layer are good.

According to the disclosure, a direct-current cable in which long-term insulating performance of an insulating layer against applied direct-current voltage and space-charge characteristics of an insulating layer are good can be provided.

First, embodiments of the invention are described in order.

FIG. 1 illustrates an example of a direct-current cable. FIG. 1 is a cross-sectional view that is perpendicular to an axial direction of a direct-current cable 1.

An outer periphery of a conductive portion 10 is covered by an insulating layer 20 in the direct-current cable 1. Further, an inner semi-conducting layer 11 is formed between the conductive portion 10 and the insulating layer 20 in the direct-current cable 1. Further, an outer periphery of the insulating layer 20 is covered by a shielding layer 30, and an outer periphery of the shielding layer 30 is covered by a covering layer 40 in the direct-current cable 1. Further, an outer semi-conducting layer 21 is formed between the insulating layer 20 and the shielding layer 30 in the direct-current cable 1.

The conductive portion 10 is formed by twisting a plurality of conductive core wires.

As the material constituting the conductive core wire, although not specifically limited, copper, aluminum, copper alloy, aluminum alloy or the like may be used.

As the material constituting the inner semi-conducting layer 11, although not specifically limited, ethylene-vinyl acetate copolymer, ethylene-ethyl acrylate copolymer, ethylene-butyl acrylate copolymer or the like may be used.

The insulating layer 20 contains cross-linked base resin and inorganic filler.

The base resin contains polyethylene.

The polyethylene may be either of low density, intermediate density and high density. Further, the polyethylene may be either of straight-chain and branched.

The cross-linked base resin is cross-linked by a cross-linking agent containing organic peroxide.

As the organic peroxide, dicumyl peroxide, t-butyl cumyl peroxide, di-t-butyl peroxide, 2,5-dimethyl-2,5-bis(t-butylperoxy)hexane, 1,3-bis(t-butylperoxyisopropyl)benzene or the like may be used.

It is preferable that the organic peroxide does not contain an aromatic ring. With this, the long-term performance against direct-current can be maintained.

The base resin may further contain copolymer of ethylene and polar monomer or polyethylene-graft-maleic anhydride.

With this, the long-term insulating performance of the insulating layer 20 against applied direct-current voltage and the space-charge characteristics of the insulating layer 20 can be improved.

As the polar monomer, although not specifically limited, ethyl acrylate, methacrylate, butyl acrylate, glycidyl methacrylate or the like may be used, and two or more of them may be used in combination.

The mass ratio of the copolymer of ethylene and polar monomer or the polyethylene-graft-maleic anhydride with respect to the polyethylene is, generally, less than or equal to 1/9, and preferably, less than or equal to 5/95. With this, the long-term insulating performance of the insulating layer 20 against applied direct-current voltage can be improved. The mass ratio of the copolymer of ethylene and polar monomer or the polyethylene-graft-maleic anhydride with respect to the polyethylene is, generally, greater than or equal to 0.01.

The BET specific surface area of the inorganic filler is greater than or equal to 5 $m^2/g$ and less than or equal to 150 $m^2/g$, and preferably, greater than or equal to 50 $m^2/g$ and less than or equal to 150 $m^2/g$. If the BET specific surface area of the inorganic filler is less than 5 $m^2/g$, the long-term insulating performance of the insulating layer 20 against applied direct-current voltage and the space-charge characteristics of the insulating layer 20 are lowered. On the other hand, if the BET specific surface area of the inorganic filler exceeds 150 $m^2/g$, the long-term insulating performance of the insulating layer 20 against applied direct-current voltage is lowered.

The mean volume diameter of the inorganic filler is less than or equal to 1.0 μm, and preferably, less than or equal to 0.5 μm. If the mean volume diameter of the inorganic filler exceeds 1.0 μm, the long-term insulating performance of the insulating layer 20 against applied direct-current and the space-charge characteristics of the insulating layer 20 are lowered. The mean volume diameter of the inorganic filler is, generally, greater than or equal to 0.02 μm.

Here, when the BET specific surface area of the inorganic filler is greater than or equal to 50 $m^2/g$, it is preferable that the mean volume diameter of the inorganic filler is greater than or equal to 0.05 μm. With this, the long-term performance against direct-current can be maintained.

The mass ratio of the inorganic filler with respect to the base resin is 0.001 to 0.05, and preferably, 0.005 to 0.03. If the mass ratio of the inorganic filler with respect to the base resin is less than 0.001 or exceeds 0.05, the long-term insulating performance of the insulating layer 20 against applied direct-current and the space-charge characteristics of the insulating layer 20 are lowered.

As the inorganic filler, although not specifically limited, magnesium oxide powder, aluminum oxide powder, silica powder, magnesium silicate powder, aluminum silicate powder, carbon black or the like may be used, and two or more of them may be used in combination. Among them, in a view of the space-charge characteristics of the insulating layer 20, the magnesium oxide powder is preferable.

A surface process by a silane coupling agent may be performed on each of the magnesium oxide powder, the aluminum oxide powder, the silica powder, the magnesium silicate powder and the aluminum silicate powder. With this, the long-term insulating performance of the insulating layer 20 against applied direct-current and the space-charge characteristics of the insulating layer 20 can be improved.

As the silane coupling agent, although not specifically limited, Vinyltrimethoxysilane, Vinyltriethoxysilane, 2-(3,4-Epoxycyclohexyl)ethyltrimethoxysilane, 3-Glycidoxypropylmethyldimethoxysilane, 3-Glycidoxypropyltrimethoxysilane, 3-Glycidoxypropylmethyldiethoxysilane, 3-Glycidoxypropyltriethoxysilane, 3-Methacryloxypropylmethyldimethoxysilane, 3-Methacryloxypropyltrimethoxysilane, 3-Methacryloxypropylmethyldiethoxysilane, 3-Methacryloxypropyltriethoxysilane, 3-Acryloxypropyltrimethoxysilane, N-(2-Aminoethyl)-3-aminopropylmethyldimethoxysilane, N-(2-Aminoethyl)-3-aminopropyltrimethoxysilane, N-(2-Aminoethyl)-3-aminopropyltriethoxysilane, 3-Aminopropyltrimethoxysilane, 3-Aminopropyltriethoxysilane, 3-Triethoxysilyl-N-(1,3-dimethylbutylidene)propylamine or the like may be used, and two or more of them may be used in combination.

Here, the inorganic filler whose surface is treated by a silane coupling agent and the inorganic filler whose surface is not treated by a silane coupling agent may be used together in combination.

A grinding process may be performed on the inorganic filler. For example, a grinding process by jet grinding may be performed on the inorganic filler, whose particle size becomes larger as being adhered with each other when performing the surface treatment using the silane coupling agent.

The insulating layer 20 may further contain an anti-oxidizing agent. With this, thermal aging resistance of the insulating layer 20 can be improved.

As the anti-oxidizing agent, although not specifically limited, 2,2-Thiodiethylene-bis[3-(3,5-di-t-butyl-4-hydroxyphenyl)propionate], Pentaerythrityl-tetrakis(3-(3,5-di-t-butyl-4-hydroxyphenyl)propionate), Octadecyl 3-(3,5-di-t-butyl-4-hydroxyphenyl)propionate, 2,4-Bis(n-octylthiomethyl)-o-cresol, 2,4-Bis(n-octylthio)-6-(4-hydroxy-3,5-di-t-butylanilino)-1,3,5-triazine, Bis[2-methyl-4-{3-n-alkyl (C12 or C14) thiopropionyloxy}-5-t-butylphenyl]sulfide, 4,4'-Thiobis(3-methyl-6-t-butylphenol) or the like may be used, and two or more of them may be used in combination.

The insulating layer 20 may further contain lubricant, a coloring agent or the like.

As the material constituting the outer semi-conducting layer 21, although not specifically limited, ethylene-vinyl acetate copolymer, ethylene-ethyl acrylate copolymer, ethylene-butyl acrylate copolymer or the like may be used.

As the material constituting the shielding layer 30, although not specifically limited, copper or the like may be used.

As the material constituting the covering layer 40, although not specifically limited, polyvinyl chloride or the like may be used.

The direct-current cable 1 may be applied for power transmission of direct-current power or the like.

Next, an example of a method of manufacturing the direct-current cable 1 is described.

The inner semi-conducting layer 11, the insulating layer 20 and the outer semi-conducting layer 21 are formed by extrusion molding a raw material of the inner semi-conducting layer 11, the composition containing the base resin, the inorganic filler and the cross-linking agent as a raw material of the insulating layer 20 and a raw material of the outer semi-conducting layer 21 at the same time at the outer periphery of the conductive portion 10, and heating it to a predetermined temperature to cross-link the base resin. Next, the shielding layer 30 is formed by winding a conductive wire such as a copper tape, or an annealed copper wire around the outer periphery of the outer semi-conducting layer 21. Further, the covering layer 40 is formed at an outer periphery of the shielding layer 30 by extrusion molding a raw material of the covering layer 40.

As the method of manufacturing the composition, although not specifically limited, a method or the like may be used in which the base resin, the inorganic filler, if necessary, the anti-oxidizing agent, the lubricant, the coloring agent and the like are kneaded to manufacture pellets, and thereafter, the cross-linking agent is heated and impregnated to the pellets.

Here, the composition may be extrusion molded by removing aggregates by using a screen mesh.

Further, the raw material of the inner semi-conducting layer 11, the above described composition and the raw material of the outer semi-conducting layer 21 may be extrusion molded at the same time.

The present invention is not limited to the specifically disclosed embodiments, and numerous variations and modifications may be made without departing from the spirit and scope of the present invention.

EXAMPLES

Next, examples of the invention are described. Here, a term "parts" means "parts by weight".

Example 1

100 parts of low density polyethylene (LDPE) with a density of 0.920 g/mm$^3$, and MFR (Melt Flow Rate) of 1 g/10 min as the base resin, 0.1 parts of magnesium oxide powder (inorganic filler 2) with a BET specific surface area of 30 m$^2$/g, and a mean volume diameter of 0.45 µm as the inorganic filler, and 0.2 parts of 4,4'-thiobis(3-methyl-6-t-butylphenol) as the anti-oxidizing agent were heated and kneaded at about 180° C. to manufacture pellets. Next, 2 parts of dicumyl peroxide as the cross-linking agent was heated and impregnated to the obtained pellets at about 60° C. to obtain composition.

Example 2

Composition was obtained similarly as Example 1 except that the amount of the inorganic filler was changed to 1 part.

Example 3

Composition was obtained similarly as Example 1 except that the amount of the inorganic filler was changed to 5 parts.

Example 4

Composition was obtained similarly as Example 2 except that magnesium oxide powder (inorganic filler 1) with a BET specific surface area of 145 m$^2$/g, and a mean volume diameter of 0.50 µm whose surface was treated by vinyltrimethoxysilane as the silane coupling agent was used, as the inorganic filler.

Example 5

Composition was obtained similarly as Example 4 except that 97 parts of LDPE with a density of 0.920 g/mm$^3$, and MFR (Melt Flow Rate) of 1 g/10 min, and 3 parts of polyethylene-graft-maleic anhydride (MA-g-PE) with a density of 0.920 g/mm$^3$, and MFR (Melt Flow Rate) of 1 g/10 min were used, as the base resin.

Example 6

Composition was obtained similarly as Example 5 except that 1.3 parts of 2,5-dimethyl-2,5-bis(t-butylperoxy)hexane was used, as the cross-linking agent.

Example 7

Composition was obtained similarly as Example 6 except that magnesium oxide powder (inorganic filler 3) with a BET specific surface area of 30 m$^2$/g, and a mean volume diameter of 0.05 µm whose surface was treated by vinyltrimethoxysilane as the silane coupling agent was used, as the inorganic filler.

Example 8

Composition was obtained similarly as Example 6 except that magnesium oxide powder (inorganic filler 4) with a BET specific surface area of 8 m$^2$/g, and a mean volume diameter of 0.2 µm whose surface was treated by vinyltrimethoxysilane as the silane coupling agent was used, as the inorganic filler.

Example 9

Composition was obtained similarly as Example 6 except that 95 parts of LDPE with a density of 0.920 g/mm$^3$, and MFR (Melt Flow Rate) of 1 g/10 min, and 5 parts of ethylene-ethyl acrylate copolymer (poly(E-co-EA)), in which the content of units originated from ethyl acrylate was 7 mass %, with a density of 0.930 g/mm$^3$, and MFR (Melt Flow Rate) of 4 g/10 min were used, as the base resin, and silica powder (inorganic filler 5) with a BET specific surface area of 50 m$^2$/g, and a mean volume diameter of 0.03 µm was used, as the inorganic filler.

Example 10

Composition was obtained similarly as Example 6 except that silica powder (inorganic filler 6) with a BET specific surface area of 90 m$^2$/g, and a mean volume diameter of 0.02 µm was used, as the inorganic filler.

Example 11

Composition was obtained similarly as Example 6 except that 97 parts of LDPE with a density of 0.920 g/mm$^3$, and MFR (Melt Flow Rate) of 1 g/10 min, and 3 parts of poly(E-co-EA), in which the content of units originated from ethyl acrylate was 7 mass %, with a density of 0.930 g/mm$^3$, and MFR (Melt Flow Rate) of 4 g/10 min were used, as the base resin, alumina powder (inorganic filler 7) with a BET specific surface area of 120 m$^2$/g, and a mean volume diameter of 0.02 µm was used, as the inorganic filler, and 1,3-bis(t-butylperoxyisopropyl)benzene was used, as the cross-linking agent.

Example 12

Composition was obtained similarly as Example 6 except that 93 parts of LDPE with a density of 0.920 g/mm$^3$, and MFR (Melt Flow Rate) of 1 g/10 min, and 7 parts of poly(E-co-EA) whose EA concentration was 7% with a density of 0.930 g/mm$^3$, and MFR (Melt Flow Rate) of 4 g/10 min were used, as the base resin, and carbon black (inorganic filler 8) with a BET specific surface area of 50 m²/g, and a mean volume diameter of 0.05 μm was used, as the inorganic filler.

Example 13

Composition was obtained similarly as Example 6 except that 1 part of magnesium oxide powder (inorganic filler 1) with a BET specific surface area of 145 m²/g, and a mean volume diameter of 0.50 μm whose surface was treated by vinyltrimethoxysilane as the silane coupling agent, and 2 parts of silica powder with a BET specific surface area of 50 m²/g, and a mean volume diameter of 0.03 μm were used, as the inorganic filler.

Example 14

Composition was obtained similarly as Example 6 except that 2 parts of magnesium oxide powder (inorganic filler 1) with a BET specific surface area of 145 m²/g, and a mean volume diameter of 0.50 μm whose surface was treated by vinyltrimethoxysilane as the silane coupling agent, and 3 parts of alumina powder with a BET specific surface area of 120 m²/g, and a mean volume diameter of 0.02 μm were used, as the inorganic filler.

Comparative Example 1

Composition was obtained similarly as Example 1 except that the inorganic filler was not used.

Comparative Example 2

Composition was obtained similarly as Example 1 except that the amount of the inorganic filler was changed to 10 parts.

Comparative Example 3

Composition was obtained similarly as Example 1 except that 2 parts of magnesium oxide powder (inorganic filler 9) with a BET specific surface area of 1.4 m²/g, and a mean volume diameter of 3 μm was used, as the inorganic filler.

Comparative Example 4

Composition was obtained similarly as Example 1 except that 2 parts of magnesium oxide powder (inorganic filler 10) with a BET specific surface area of 0.5 m²/g, and a mean volume diameter of 17 μm was used, as the inorganic filler.

Comparative Example 5

Composition was obtained similarly as Example 1 except that 2 parts of alumina powder (inorganic filler 11) with a BET specific surface area of 4.1 m²/g, and a mean volume diameter of 1.5 μm was used, as the inorganic filler.

Example 15

Composition was obtained similarly as Example 6 except that magnesium oxide powder (inorganic filler 12) with a BET specific surface area of 80 m²/g, and a mean volume diameter of 0.05 μm was used, as the inorganic filler.

Comparative Example 6

Composition was obtained similarly as Example 1 except that 2 parts of magnesium oxide powder (inorganic filler 13) with a BET specific surface area of 160 m²/g, and a mean volume diameter of 0.3 μm was used, as the inorganic filler.

Here, the BET specific surface area conformed JIS Z8830 and ISO 9277, and was measured by a fluid process. The mean volume diameter was measured using a laser diffraction particle size analyzer.

Characteristics of inorganic fillers 1 to 13 contained in the compositions of Examples 1 to 15 and Comparative examples 1 to 6 are illustrated in Table 1.

TABLE 1

| INORGANIC FILLER | MATERIAL | BET SPECIFIC SURFACE AREA [m²/g] | MEAN VOLUME DIAMETER [μm] | SURFACE TREATMENT |
|---|---|---|---|---|
| 1 | MAGNESIUM OXIDE | 145 | 0.5 | WITH |
| 2 | MAGNESIUM OXIDE | 30 | 0.45 | WITHOUT |
| 3 | MAGNESIUM OXIDE | 30 | 0.05 | WITH |
| 4 | MAGNESIUM OXIDE | 8 | 0.2 | WITH |
| 5 | SILICA | 50 | 0.03 | WITHOUT |
| 6 | SILICA | 90 | 0.02 | WITHOUT |
| 7 | ALUMINA | 120 | 0.02 | WITHOUT |
| 8 | CARBON BLACK | 50 | 0.05 | WITHOUT |
| 9 | MAGNESIUM OXIDE | 1.4 | 3 | WITHOUT |
| 10 | MAGNESIUM OXIDE | 0.5 | 17 | WITHOUT |
| 11 | ALUMINA | 4.1 | 1.5 | WITHOUT |
| 12 | MAGNESIUM OXIDE | 80 | 0.05 | WITHOUT |
| 13 | MAGNESIUM OXIDE | 160 | 0.3 | WITHOUT |

Characteristics of the compositions of Examples 1 to 15 and Comparative examples 1 to 6 are illustrated in Table 2.

TABLE 2

| | AMOUNT OF BASE RESIN (PARTS) | | | INORGANIC FILLER | | | |
|---|---|---|---|---|---|---|---|
| | LDPE | MA-g-PE | Poly (E-co-EA) | NO. | AMOUNT (PARTS) | NO. | AMOUNT (PARTS) |
| EXAMPLE 1 | 100 | 0 | 0 | 2 | 0.1 | — | — |
| EXAMPLE 2 | 100 | 0 | 0 | 2 | 1 | — | — |
| EXAMPLE 3 | 100 | 0 | 0 | 2 | 5 | — | — |
| EXAMPLE 4 | 100 | 0 | 0 | 1 | 1 | — | — |
| EXAMPLE 5 | 97 | 3 | 0 | 1 | 1 | — | — |
| EXAMPLE 6 | 97 | 3 | 0 | 1 | 1 | — | — |
| EXAMPLE 7 | 97 | 3 | 0 | 3 | 1 | — | — |
| EXAMPLE 8 | 97 | 3 | 0 | 4 | 1 | — | — |
| EXAMPLE 9 | 95 | 0 | 5 | 5 | 1 | — | — |
| EXAMPLE 10 | 97 | 3 | 0 | 6 | 1 | — | — |
| EXAMPLE 11 | 97 | 0 | 3 | 7 | 1 | — | — |
| EXAMPLE 12 | 93 | 0 | 7 | 8 | 1 | — | — |
| EXAMPLE 13 | 97 | 3 | 0 | 1 | 1 | 3 | 2 |
| EXAMPLE 14 | 97 | 3 | 0 | 1 | 2 | 5 | 3 |
| EXAMPLE 15 | 97 | 3 | 0 | 12 | 1 | — | — |
| COMPARATIVE EXAMPLE 1 | 100 | 0 | 0 | — | — | — | — |
| COMPARATIVE EXAMPLE 2 | 100 | 0 | 0 | 2 | 10 | — | — |
| COMPARATIVE EXAMPLE 3 | 100 | 0 | 0 | 9 | 2 | — | — |
| COMPARATIVE EXAMPLE 4 | 100 | 0 | 0 | 10 | 2 | — | — |
| COMPARATIVE EXAMPLE 5 | 100 | 0 | 0 | 11 | 2 | — | — |
| COMPARATIVE EXAMPLE 6 | 100 | 0 | 0 | 13 | 2 | — | — |

(Manufacturing of Sheet)

Each of the compositions of Examples 1 to 15 and Comparative examples 1 to 6 was press molded to obtain a sheet with thickness T of 0.15 mm.

Next, specific volume resistance, long-term insulating performance against applied direct-current voltage and space-charge characteristics of each of the sheets were evaluated.

(Specific Volume Resistance)

Specific volume resistance was measured by soaking the sheet in silicone oil of 90° C., and applying a direct electric field of 80 kV/mm to the sheet using a flat plate electrode with a diameter of 25 mm.

(Long-Term Insulating Performance Against Applied Direct-Current Voltage)

Using the sheet, a V-t curve was obtained by soaking the sheet in silicone oil of 90° C., applying a direct electric field $V_0$ [kV/mm] of 10 to 300 kV/mm to the sheet using a flat plate electrode with a diameter of 25 mm and measuring a period "t" [h] until dielectric breakdown occurs in the sheet. Next, life exponent "n" was obtained from the formula $$V_0^n \times t = \text{const.},$$

and long-term insulating performance against applied direct-current voltage was evaluated. Here, when "n" was greater than or equal to 20, it was determined to be "A", when "n" was greater than or equal to 15 and less than 20, it was determined to be "B", and when "n" was less than 15, it was determined to be "C".

(Space-Charge Characteristics)

Space-charge characteristics of the sheet were evaluated using a Pulsed Electro Acoustic Non-destructive Test System (manufactured by Five Lab). Specifically, space-charge characteristics of the sheet was evaluated by continuously applying a direct electric field $V_0$ of 50 kV/mm to the sheet under atmospheric pressure at 30° C. for an hour, measuring maximum electric field $V_1$ in the sheet, and obtaining Field Enhancement Factor FEF defined by the formula $$V_1/(V_0 \times T).$$

Here, when the FEF was less than 1.15, it was determined to be "A" and when the FEF was greater than or equal to 1.15, it was determined to be "B".

Evaluated results of the specific volume resistance, the long-term insulating performance against applied direct-current current and the space-charge characteristics of each of the sheets manufactured from the compositions of Examples 1 to 15, and Comparative examples 1 to 6 are illustrated in Table 3.

TABLE 3

| | SPECIFIC VOLUME RESISTANCE [Ω · cm] | LONG-TERM INSULATING PERFORMANCE AGAINST DIRECT-CURRENT | SPACE-CHARGE CHARACTERISTICS |
|---|---|---|---|
| EXAMPLE 1 | $1 \times 10^{15}$ | B | A |
| EXAMPLE 2 | $3 \times 10^{15}$ | B | A |
| EXAMPLE 3 | $2 \times 10^{15}$ | B | A |
| EXAMPLE 4 | $5 \times 10^{15}$ | B | A |
| EXAMPLE 5 | $7 \times 10^{15}$ | B | A |
| EXAMPLE 6 | $9 \times 10^{15}$ | A | A |
| EXAMPLE 7 | $8 \times 10^{15}$ | A | A |
| EXAMPLE 8 | $6 \times 10^{15}$ | A | A |
| EXAMPLE 9 | $5 \times 10^{15}$ | A | A |

TABLE 3-continued

| | SPECIFIC VOLUME RESISTANCE [Ω · cm] | LONG-TERM INSULATING PERFORMANCE AGAINST DIRECT-CURRENT | SPACE-CHARGE CHARACTERISTICS |
|---|---|---|---|
| EXAMPLE 10 | $5 \times 10^{15}$ | A | A |
| EXAMPLE 11 | $3 \times 10^{15}$ | B | A |
| EXAMPLE 12 | $6 \times 10^{15}$ | A | A |
| EXAMPLE 13 | $7 \times 10^{15}$ | A | A |
| EXAMPLE 14 | $5 \times 10^{15}$ | A | A |
| EXAMPLE 15 | $1 \times 10^{15}$ | B | A |
| COMPARATIVE EXAMPLE 1 | $2 \times 10^{13}$ | C | B |
| COMPARATIVE EXAMPLE 2 | $1 \times 10^{15}$ | C | B |
| COMPARATIVE EXAMPLE 3 | $1 \times 10^{14}$ | C | B |
| COMPARATIVE EXAMPLE 4 | $2 \times 10^{14}$ | C | B |
| COMPARATIVE EXAMPLE 5 | $9 \times 10^{13}$ | C | B |
| COMPARATIVE EXAMPLE 6 | $1 \times 10^{15}$ | C | A |

From Table 3, for each of the sheets manufactured from the compositions of Examples 1 to 15, respectively, it can be understood that the specific volume resistance is high, and the long-term insulating performance against applied direct-current voltage and the space-charge characteristics are good.

On the other hand, as the sheet manufactured from the composition of Comparative example 1 does not contain inorganic filler, the specific volume resistance, the long-term insulating performance against applied direct-current voltage and the space-charge characteristics are lowered.

For the sheet manufactured from the composition of Comparative example 2, as the mass ratio of the inorganic filler 2 with respect to the base resin is 0.1, the long-term insulating performance against applied direct-current voltage and the space-charge characteristics are lowered.

For the sheet manufactured from the composition of Comparative example 3, as the BET specific surface area and the mean volume diameter of the inorganic filler 9 are 1.4 m²/g and 3 μm, respectively, the specific volume resistance, the long-term insulating performance against applied direct-current voltage and the space-charge characteristics are lowered.

For the sheet manufactured from the composition of Comparative example 4, as the BET specific surface area and the mean volume diameter of the inorganic filler 10 are 0.5 m²/g and 17 μm, respectively, the specific volume resistance, the long-term insulating performance against applied direct-current voltage and the space-charge characteristics are lowered.

For the sheet manufactured from the composition of Comparative example 5, as the BET specific surface area and the mean volume diameter of the inorganic filler 11 are 4.1 m²/g and 1.5 μm, respectively, the specific volume resistance, the long-term insulating performance against applied direct-current voltage and the space-charge characteristics are lowered.

For the sheet manufactured from the composition of Comparative example 6, as the BET specific surface area of the inorganic filler 13 is 160 m²/g, the long-term insulating performance against applied direct-current voltage is lowered.

(Manufacturing of Direct-Current Cable 1)

First, the conductive portion 10 formed by twisting conductive core wires made of a dilute copper alloy with a diameter of 14 mm was prepared. Next, the inner semi-conducting layer 11 made of ethylene-ethyl acrylate copolymer, the composition as the raw material of the insulating layer 20 and the outer semi-conducting layer 21 made of ethylene-ethyl acrylate copolymer were extrusion molded at the same time at the outer periphery of the conductive portion 10 to be the thicknesses of 1 mm, 14 mm and 1 mm, respectively. Then, the product was heated at about 250° C. to cross link the base resin and to form the inner semi-conducting layer 11, the insulating layer 20 and the outer semi-conducting layer 21. Next, the shielding layer 30 was formed by winding a conductive wire such as an annealed copper wire or the like with the diameter of 1 mm around the outer periphery of the outer semi-conducting layer 21. Then, the covering layer 40 with the thickness of 3 mm was formed by extrusion molding polyvinyl chloride at the outer periphery of the shielding layer 30 to obtain the direct-current cable 1.

NUMERALS 1 direct-current cable
10 conductive portion
11 inner semi-conducting layer
20 insulating layer
21 outer semi-conducting layer
30 shielding layer
40 covering layer

What is claimed is:

1. A direct-current cable comprising:
   a conductive portion; and
   an insulating layer covering an outer periphery of the conductive portion,
   the insulating layer containing cross-linked base resin and inorganic filler consisting of only magnesium oxide powder,
   the base resin containing polyethylene,
   a BET specific surface area of the magnesium oxide powder being greater than or equal to 50 m²/g and less than or equal to 150 m²/g, and a mean volume diameter of the magnesium oxide powder being greater than or equal to 0.05 μm and less than or equal to 1.0 μm,
   the mass ratio of the inorganic filler with respect to the base resin being greater than or equal to 0.001 and less than or equal to 0.05,
   the cross-linked base resin being cross-linked by a cross-linking agent containing organic peroxide,
   wherein a surface of the magnesium oxide powder is treated by a silane coupling agent, and
   wherein the cross-linking agent is 2,5-dimethyl-2,5-bis(t-butylperoxy)hexane.

2. The direct-current cable according to claim 1,
   wherein the base resin further contains copolymer of ethylene and polar monomer or polyethylene-graft-maleic anhydride, and wherein the mass ratio of the copolymer of ethylene and polar monomer or the polyethylene-graft-maleic anhydride with respect to the polyethylene is less than or equal to 1/9.

3. A composition comprising: base resin, inorganic filler and a cross-linking agent,
the inorganic filler consisting of only magnesium oxide powder,
the base resin containing polyethylene,
a BET specific surface area of the magnesium oxide powder being greater than or equal to 50 m$^2$/g and less than or equal to 150 m$^2$/g, and a mean volume diameter of the magnesium oxide powder being greater than or equal to 0.05 μm and less than or equal to 1.0 μm,
the mass ratio of the magnesium oxide powder with respect to the base resin being greater than or equal to 0.001 and less than or equal to 0.05,
the cross-linking agent containing organic peroxide,
wherein a surface of the magnesium oxide powder is treated by a silane coupling agent, and
wherein the cross-linking agent is 2,5-dimethyl-2,5-bis(t-butylperoxy)hexane.

4. The composition according to claim 3,
wherein the base resin further contains copolymer of ethylene and polar monomer or polyethylene-graft-maleic anhydride, and
wherein the mass ratio of the copolymer of ethylene and polar monomer or the polyethylene-graft-maleic anhydride with respect to the polyethylene is less than or equal to 1/9.

5. A method of manufacturing a direct-current cable in which an outer periphery of a conductive portion is covered by an insulating layer, comprising:
manufacturing an extrusion molded material by extrusion molding the composition as claimed in claim 3 to cover an outer periphery of the conductive portion; and
forming the insulating layer by heating the extrusion molded material at a predetermined temperature to cross link the base resin.

6. The direct-current cable according to claim 1, wherein the base resin further contains polyethylene-graft-maleic anhydride and the mass ratio of the polyethylene-graft-maleic anhydride with respect to the polyethylene is less than or equal to 5/95.

7. The composition according to claim 3, wherein the base resin further contains polyethylene-graft-maleic anhydride and the mass ratio of the polyethylene-graft-maleic anhydride with respect to the polyethylene is less than or equal to 5/95.

\* \* \* \* \*